Aug. 14, 1923.
B. CONNOLLY
ANIMAL TRAP
Filed April 17, 1922          3 Sheets-Sheet 1
1,464,697
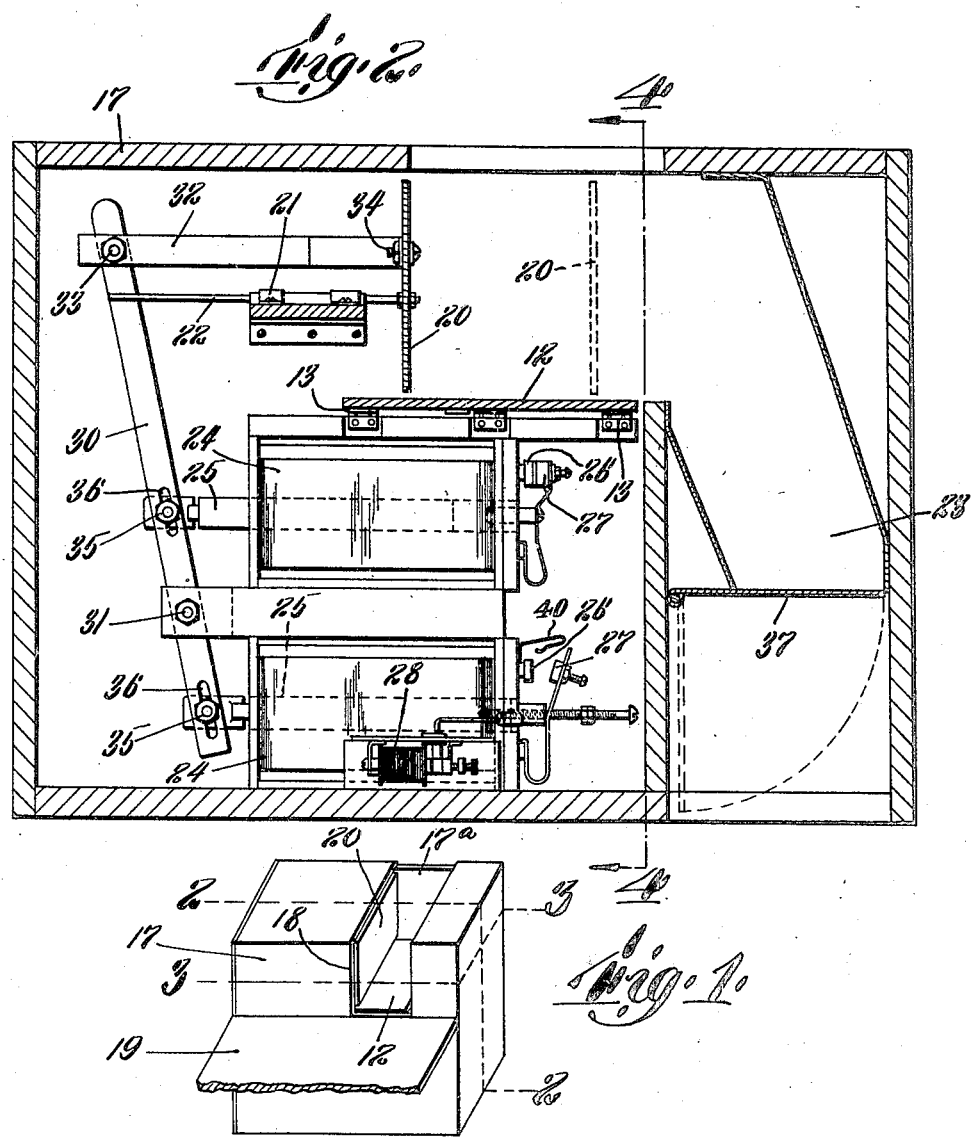

Aug. 14, 1923.

B. CONNOLLY

ANIMAL TRAP

Filed April 17, 1922     3 Sheets-Sheet 2

1,464,697

Inventor
Bartholomew Connolly
by his attorneys

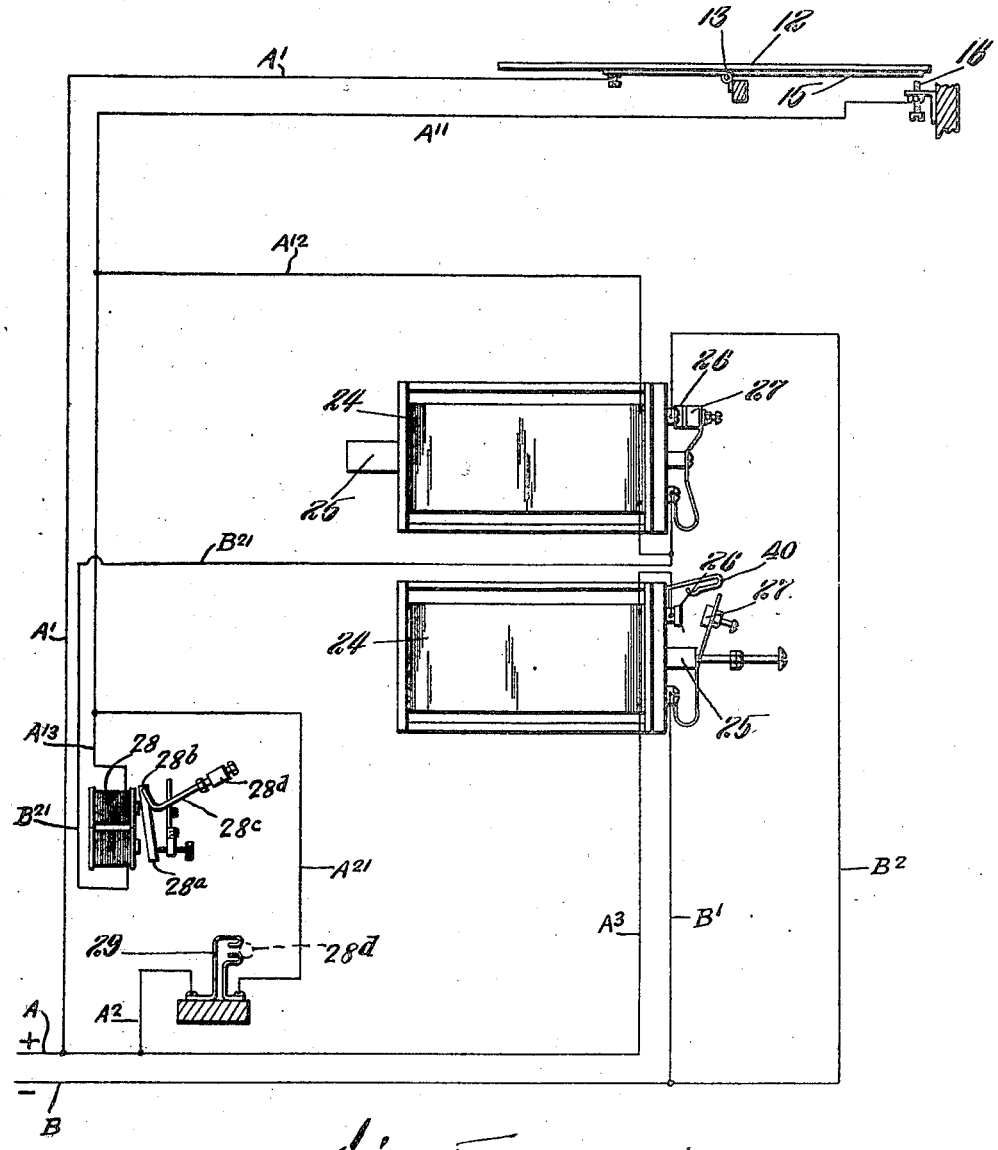

Patented Aug. 14, 1923.

1,464,697

UNITED STATES PATENT OFFICE.

BARTHOLOMEW CONNOLLY, OF BOSTON, MASSACHUSETTS.

ANIMAL TRAP.

Application filed April 17, 1922. Serial No. 554,056.

*To all whom it may concern:*

Be it known that I, BARTHOLOMEW CONNOLLY, a citizen of the United States, residing at Boston, in the county of Suffolk and State of Massachusetts, have invented new and useful Improvements in Animal Traps, of which the following is a specification.

This invention relates to an animal trap designed principally to catch rats and other rodents.

The invention is embodied in a trap including an electric motor, a platform operable by the weight of an animal to start the motor and operating automatically to stop the motor, after a cycle of motion, and a ram projected over the platform during the first part of the cycle to sweep the animal from the platform into a receptacle, and retracted over the platform during the last part of the cycle, the arrangement being such that when the motor stops, the ram is set for the next operation.

Of the accompanying drawings forming a part of this specification,—

Figure 1 is a perspective view showing the exterior of an animal trap embodying the invention.

Figure 2 is a vertical section on the plane indicated by line 2—2 of Figure 1.

Figure 5 is a diagrammatic view, showing the platform, the solenoidal magnets hereinafter described, and the electrical connections.

The same reference characters indicate the same parts in all of the figures.

Figure 4:
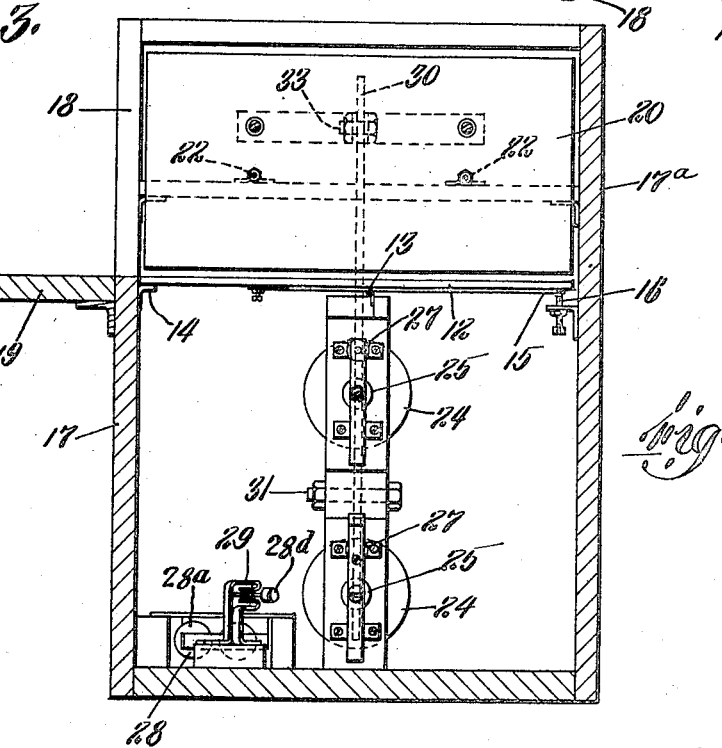
Figure 4 is a section on line 4—4 of Figure 2, and elevation of the parts at the left of said line.

In the drawings, 12 represents a movable platform, which is in the path naturally taken by an animal when searching for food, the platform being vertically movable by the weight of the animal. Preferably the platform is connected by hinges 13 (Figure 4) to a fixed support, and arranged so that one end normally rests on a fixed support 14. The opposite end is provided with an electrode 15, included in the electric circuit hereinafter described, and normally separated from the fixed electrode 16, also included in said circuit.

For convenience, I will refer to the end of the platform resting on the support 14, as the front end, and the end having the electrode 15, the rear end.

Figure 3:
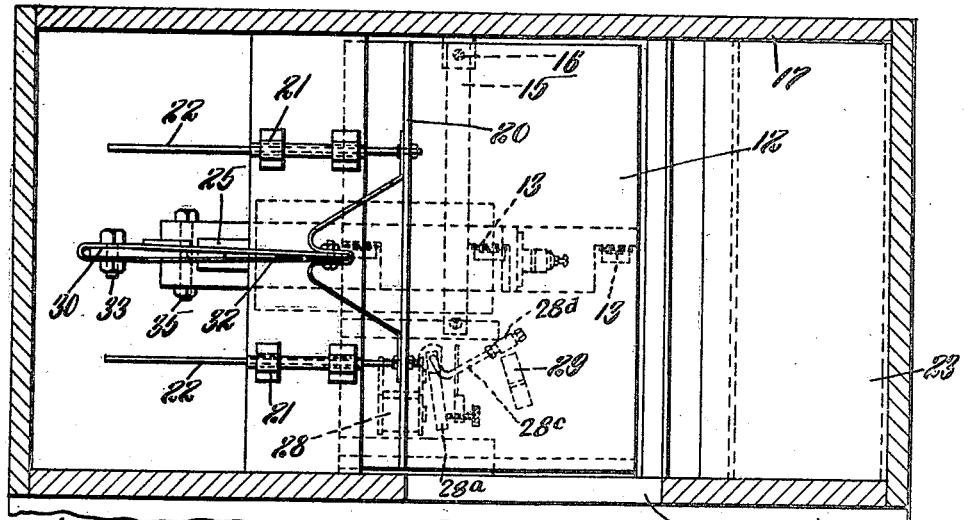
Figure 3 is a horizontal section on the plane indicated by line 3—3 of Figure 1.

The platform 12 is preferably contained in a casing or enclosure 17, having an opening 18, permitting access to the front end of the platform 12. A fixed runway 19 practically flush with the platform 12, may be located at the exterior of the casing, as indicated by Figures 1 and 3. The opening 18 constitutes an entrance for an animal who may be attracted by bait, located at any convenient point above the inner end of the platform 12. The arrangement is such that when an animal enters the opening, and moves sufficiently toward the rear end of the platform 12, said end is depressed, and the electric circuit is closed by the contact of the electrodes 15 and 16 with each other.

20 represents a ram adapted to reciprocate in a predetermined path over the platform 12, the ram being preferably a flat plate substantially perpendicular to the platform and adapted to be projected and retracted over the platform, the ram, when retracted, being near one edge of the platform, as indicated by Figures 1 and 2. The ram may be supported and guided by any suitable means, such as fixed guides 21, within the enclosure, and rods 22 fixed to the ram and slidable in said guides.

Actuated by the closure of the circuit which includes the electrodes 15 and 16, is a motor, organized to impart a quick movement to the ram in such manner as to abruptly knock an animal from the platform 12 into a receptacle 23, beside and extending below the platform, said motor being operable, when the circuit is closed, by the electrodes 15 and 16 to move the ram 20 quickly from the position shown by full lines to that shown by dotted lines in Figure 2, thus knocking off an animal, and to return the ram to the full line position, the motor then becoming inactive, so that the trap is set for the next operation.

The motor preferably includes two solenoidal magnets 24, rigidly supported within the enclosure 17, and having their axes arranged parallel with each other, and soft iron cores 25, reciprocable in said magnets. The magnets are energized alternately, each being provided with a switch which includes a fixed electrode 26 and a spring-pressed movable electrode 27, which is movable by the core 25.

The circuit connections shown diagrammatically by Figure 5, include a relay comprising an electro-magnet 28, an armature $28^a$, pivoted at $28^b$, an angular arm $28^c$ fixed to the armature, and provided with a contact $28^d$ which is oscillated by movements of the armature, and spaced apart contacts 29, located in the path of the contact $28^d$, the arrangement being such that when the armature is released by the magnet, the contact $28^d$ is separated from the contacts 29, as shown by dotted lines in Figure 3, and when the armature is attracted the contact $28^d$ touches each of the contacts 29, as shown diagrammatically by Figure 5.

The cores 25 are mechanically connected with the ram 20, preferably by the means next described. 30 represents a rocker arm, pivoted at 31 to a fixed support between the magnets. 32 represents a connecting rod, pivoted at 33 to the rocker arm, and attached at 34 to the ram 20. The cores 25, arranged at opposite sides of the pivot or fulcrum 31, are connected with the rocker arm 30 by bolts 35, extending through slots 36 in the rocker arm. The arrangement is such that the magnets 24 are energized alternately, that is to say, when the platform 12 is depressed by an animal, one of the magnets is energized and imparts a quick endwise movement to its core 25, causing the core to first impart a forward or knocking-off movement to the ram, and then separate the contacts 26 and 27 of the accompanying switch so that the magnet is demagnetized. The core of the other magnet is at the same time moved in the opposite direction to engage the contacts of the accompanying switch with each other and energize the last mentioned magnet, so that the ram is retracted or moved back and remains in the full line position shown by Figure 2, until the platform is moved by the next animal, whereupon the above described operation is repeated.

The motor above described is adapted to impart a sufficiently quick movement to the ram to knock an animal from the platform 12, the movement being so abrupt that the animal is precipitated into the receptacle 23. The receptacle, as here shown, is a chute, which may be provided with a hinged and spring-pressed trap door 37, adapted to yield to the weight of a falling animal and to close when the animal has passed.

The enclosure 17 may be of any suitable form, its chief function being to conceal the mechanism of the trap, excepting the platform 12, and the ram 20, and to provide an entrance, not likely to cause suspicion on the part of a rat which, as is well known, is a very sagacious and wary animal. The ram, formed as a flat plate, conceals the mechanism behind it, the ram and the platform 12 presenting adjacent surfaces of simple and apparently harmless form. The enclosure may have a portion $17^a$ above the inner end of the platform 12, adapted in any suitable way to support bait out of the path of the ram.

I am not limited to the particular motor organization here shown, and may variously modify the same to cause a quick movement of the ram, it being evident that the ram must move very quickly and abruptly.

The circuit connections shown by Figure 5, and the operation thereof, are as follows: One side of the main circuit is designated by reference letter A, with exponents, and the other side by reference letter B, with exponents. When 15 contacts with 16, wire A is connected through wire $A'$, contacts 15 and 16, wires $A''$, $A^{12}$, the coil of the upper solenoid, wire $B^{21}$, contacts 27 and 26, and wire $B^2$ to wire B. Connection is also made through wire $A^{13}$, relay coils 28, wire $B^{21}$, the contacts 27 and 26 of the upper solenoid, and wire $B^2$ to wire B. Wire $A^{13}$ is connected by wire $A^{21}$ with one of the contacts 29. The other contact 29 is connected by wire $A^2$ with wire A.

The energized relay is caused to close contact $28^d$ against contacts 29, so that the circuit remains briefly closed after the return of the platform to its normal position. The core 25 of the upper solenoid is now moved into the coil thereof, causing the ram to sweep over the platform. At the same time the core of the lower solenoid is drawn out by the rocker arm 30 from the coil. When the upper core is near the end of its stroke, it pushes the contact 27 away from the contact 26, thus demagnetizing that solenoid and the relay. When the lower core is drawn out the contacts 27 and 26 of the lower solenoid meet near the end of that stroke of the core. The energized lower solenoid now draws in its core, thus resetting the trap. The coil of the lower solenoid is demagnetized in the same way as the coil of the upper solenoid. A spring clip 40 on the lower solenoid holds the contact 27 against the contact 26, while the core of the lower solenoid is in mid position.

I claim:

1. An animal trap comprising an electric motor, fixed and movable contacts, a circuit for said motor controlled by said contacts, a movable platform carrying said movable contact and normally biased to hold said contacts separated but actuated by the weight of an animal thereon, to close said contacts, and a ram operatively related to said motor to be advanced at each energization thereof by the closing of said contacts over said platform, to knock the animal therefrom and then to be retracted.

2. An animal trap comprising a reversible electric motor, an electric circuit in which the motor is included, said circuit including a fixed and a movable electrode, a movable platform carrying the movable electrode, and biased to normally separate said electrodes and break the circuit, the platform being movable by the weight of an animal upon it, to close the circuit and energize the motor, automatic switches operable by the energization of the motor to cause a cycle of movement of the motor, and to then arrest the said movement, a ram adapted to reciprocate in a predetermined path adjacent to the platform, mechanical connection between the ram and the motor, whereby, when the motor is energized, the ram is alternately projected and retracted over the platform, the organization being such that the ram is retracted when the movement of the motor is arrested.

3. An animal trap comprising a movable platform, a movable ram, means for guiding said ram in a path adjacent to the platform, an electric motor composed of a pair of solenoidal magnets having reciprocating cores, mechanical connections between said cores and the ram, said magnets being included in an electric circuit, which includes also a stationary electrode and a movable electrode fixed to and movable with the platform, and movable by the weight of an animal to close the circuit, the platform being normally in position to break the circuit, and automatic switches operable by said cores to energize the magnets alternately, the organization being such that the ram is operated to knock an animal from the platform when the latter is moved by the weight of the animal.

In testimony whereof I have affixed my signature.

BARTHOLOMEW CONNOLLY.